United States Patent
Tzur et al.

(10) Patent No.: US 11,587,094 B2
(45) Date of Patent: Feb. 21, 2023

(54) CUSTOMER SERVICE TICKET EVALUATION USING MULTIPLE TIME-BASED MACHINE LEARNING MODELS CUSTOMER

(71) Applicant: EMC IP Holding Company LLC, Hopkinton, MA (US)

(72) Inventors: Anat Parush Tzur, Beer Sheva (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 379 days.

(21) Appl. No.: 16/587,364

(22) Filed: Sep. 30, 2019

(65) Prior Publication Data
US 2021/0097551 A1    Apr. 1, 2021

(51) Int. Cl.
G06Q 30/00        (2012.01)
G06N 20/20        (2019.01)
G06Q 30/016       (2023.01)

(52) U.S. Cl.
CPC ........ *G06Q 30/016* (2013.01); *G06N 20/20* (2019.01)

(58) Field of Classification Search
USPC ......... 705/1.1, 7.15, 304; 707/708; 706/12; 717/174; 378/88; 382/159
See application file for complete search history.

(56) References Cited

U.S. PATENT DOCUMENTS 10,209,974 B1 * 2/2019 Patton ............... G06F 8/60
                                                717/174
10,430,723 B1 * 10/2019 Tzur ................ G06N 20/00
                                                706/12
10,438,212 B1 * 10/2019 Jilani ............... G06N 5/025
                                                705/304

(Continued)

OTHER PUBLICATIONS

"How to Prioritize Help Desk Tickets When Everything is a Top Priority", https://logicalread.com/prioritize-help-desk-tickets/#.XX-WAChKgVA, downloaded on Sep. 16, 2019.

(Continued)

*Primary Examiner* — Lynda Jasmin
*Assistant Examiner* — Kimberly L Evans
(74) *Attorney, Agent, or Firm* — Ryan, Mason & Lewis, LLP

(57) ABSTRACT

Techniques are provided for customer service ticket prioritization using multiple time-based machine learning models. One method comprises obtaining a customer service ticket; collecting, in response to the obtaining, features related to the customer service ticket comprising dynamic information regarding activities performed to address the customer service ticket and textual information describing the customer service ticket; applying the collected features to one of multiple machine learning models to obtain a distress score indicating a likelihood that the customer service ticket will become a distressed customer service ticket, wherein the multiple machine learning models each correspond to different time periods and are trained on historical data and the collected features are applied to the one machine learning model based on an age of the customer service ticket; and processing multiple customer support tickets based on the distress score. The machine learning models are trained using cumulative corresponding historical training data associated with a respective one of hourly, daily, weekly and monthly time periods.

20 Claims, 6 Drawing Sheets

(56) References Cited

U.S. PATENT DOCUMENTS

| | | | | |
|---|---|---|---|---|
| 10,699,703 B2* | 6/2020 | Green | ............... | H04M 3/2281 378/88 |
| 11,017,268 B2* | 5/2021 | Kansal | ............... | G06Q 30/016 382/159 |
| 2011/0270770 A1* | 11/2011 | Cunningham | ....... | G06Q 30/016 706/12 |
| 2014/0358608 A1* | 12/2014 | Bianchi | .......... | G06Q 10/063114 705/7.15 |
| 2016/0358099 A1* | 12/2016 | Sturlaugson | ........... | G06N 5/043 706/12 |
| 2017/0372231 A1* | 12/2017 | Ghatage | ................ | G06F 40/58 706/12 |
| 2018/0211260 A1* | 7/2018 | Zhang | ................... | G06N 20/00 707/708 |
| 2018/0247218 A1* | 8/2018 | Fiumara | ................ | G06N 5/022 706/12 |
| 2019/0158366 A1* | 5/2019 | Higgins | ................ | G10L 25/63 705/304 |
| 2021/0004706 A1* | 1/2021 | Riddle | ................ | G06Q 30/016 706/12 |

OTHER PUBLICATIONS

"How to Identify Your Most Important Customer Service Inquiries", https7/.superoffice.com/blog/prioritizing-customer-service-inquiries/, downloaded on Sep. 16, 2019.

"6 Best Practices for Support Ticket Prioritization", https://www.agilecrm.com/blog/6-best-practices-support-ticket-prioritization/, downloaded on Sep. 16, 2019.

\* cited by examiner

CUSTOMER SERVICE TICKET EVALUATION USING MULTIPLE TIME-BASED MACHINE LEARNING MODELS CUSTOMER

FIELD

The field relates generally to information processing, and more particularly, to the processing of customer service tickets.

BACKGROUND

Customer service requests are often documented using customer service tickets. In the field of IT (Information Technology), for example, a ticketing system is often used to manage IT tickets. There is often a large number of customer service tickets to be processed within a given organization. For example, in the IT context, a large number of customer service tickets are often encountered, for example, when a server fails, or when a failure occurs with one or more devices or systems of a user or the organization. It is often challenging to prioritize pending customer service tickets in order to avoid distressed service requests.

A need therefore exists for techniques for prioritizing customer service tickets.

SUMMARY

In one embodiment, a method comprises obtaining a customer service ticket; collecting, in response to the obtaining, a plurality of features related to the customer service ticket, wherein the plurality of features comprises dynamic information regarding activities performed to address the customer service ticket and textual information describing at least a portion of the customer service ticket; applying the collected plurality of features to at least one of a plurality of machine learning models to obtain a distress score indicating a likelihood that the customer service ticket will become a distressed customer service ticket, wherein the plurality of machine learning models each correspond to a different time period and are trained on historical data based on the corresponding different time period and wherein the collected plurality of features are applied to the at least one machine learning model based on an age of the customer service ticket; and processing a plurality of customer support tickets based at least in part on the distress score.

In some embodiments, the machine learning models corresponding to the different time periods each correspond to one of hourly, daily, weekly and monthly time periods since the initiation of the customer support ticket, and are trained using cumulative corresponding historical training data associated with the respective one of the hourly, daily, weekly and monthly time periods since the initiation of the customer support ticket. A base machine learning model with static features can be used for a time period immediately following the obtaining.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for customer service ticket prioritization using multiple time-based machine learning models.

As noted above, it is often challenging to prioritize customer service tickets in order to avoid distressed service requests. Existing techniques for prioritizing customer service tickets are typically based on a set of rules that evaluate a set of variables. The rule-based techniques, however, suffer from low precision (e.g., false alerts) and low coverage (e.g., missing events).

In one or more embodiments, customer service ticket prioritization techniques are provided that collect dynamic and textual features related to a new customer service ticket and apply the collected features to one of multiple machine learning models that each correspond to a different time period. The one machine learning model is selected based on an age of the customer service ticket and provides a distress score indicating a likelihood that the customer service ticket will become a distressed customer service ticket.

Figure 1:
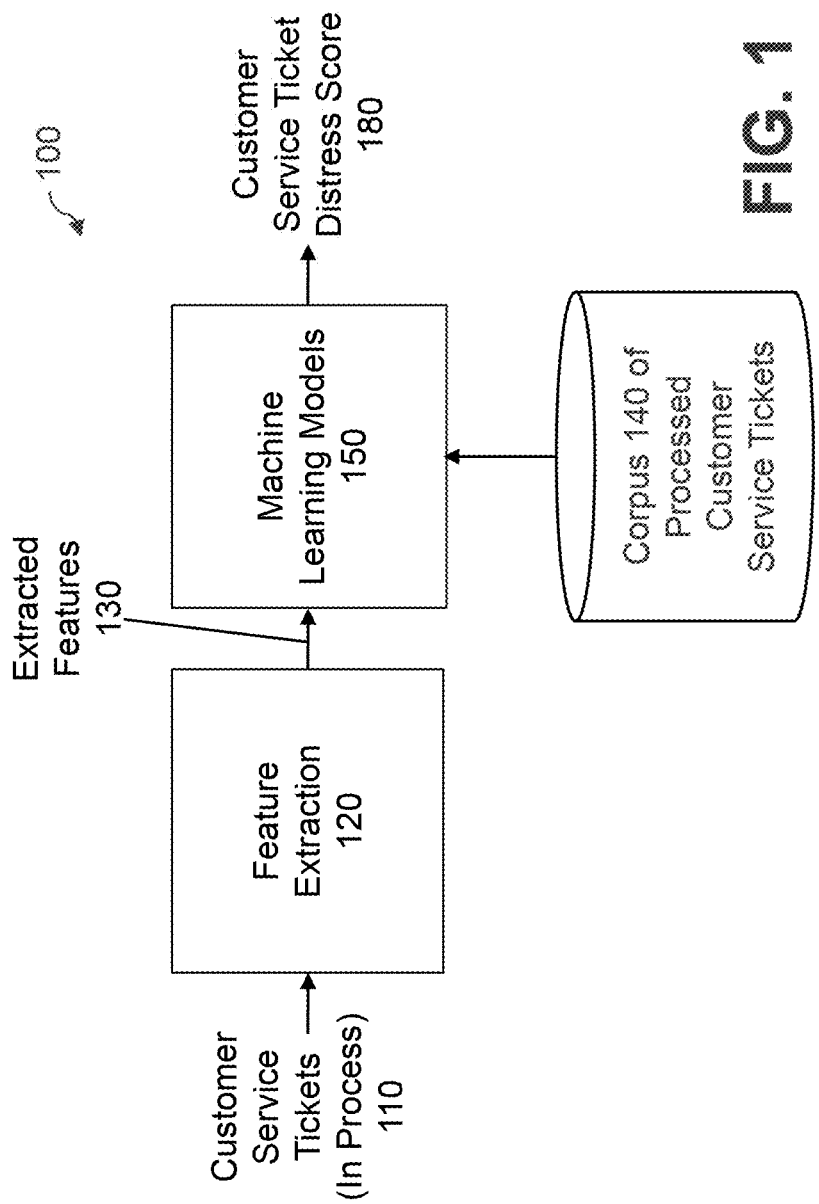
FIG. 1 illustrates an exemplary customer service ticket prioritization system, according to an embodiment of the disclosure.

FIG. 1 illustrates an exemplary customer service ticket prioritization system 100, according to an embodiment of the disclosure. As shown in FIG. 1, one or more customer service tickets 110 are applied to a feature extraction module 120 that extracts a number of extracted features 130. In some embodiments, the feature extraction module 120 extracts dynamic information regarding activities performed to address the customer service ticket and textual information describing at least a portion of the customer service ticket, as discussed further below in conjunction with FIG. 2. In addition, the exemplary feature extraction module 120 optionally determines a frequency of activities performed to address the customer service ticket, product information, customer information and install base information.

Generally, given a new customer service ticket 110, the exemplary customer service ticket prioritization system 100 collects more information over time as the customer service ticket 110 is pending (e.g., information from the first day of the customer service ticket 110 and the information grows over time). In this manner, the accuracy of the customer service ticket prioritization system 100 increases as more information is collected over time.

The extracted features 130 are applied to at least one machine learning model 150-$i$ from a collection of machine learning models 150, as discussed further below in conjunction with FIG. 3. The selected at least one machine learning model 150-$i$ determines a customer service ticket distress score 180 indicating a likelihood that a given customer service ticket 110 will become a distressed customer service ticket, for example, based on one or more predefined distress criteria.

The collection of machine learning models 150 are trained using a corpus 140 of processed customer service tickets. In some embodiments, the corpus 140 of processed customer service tickets are labeled with an indication of whether each processed customer service ticket in the corpus 140 was a distressed customer service ticket.

In one or more embodiments, the customer service ticket distress score 180 provides a smart metric that considers multiple aspects of the ticket, such as:
1. account related information (e.g., account history, geo-location and size);
2. product and install base data;
3. textual content of the service description; and/or
4. dynamic information about activities that were performed to address a given customer service ticket.

Figure 2:
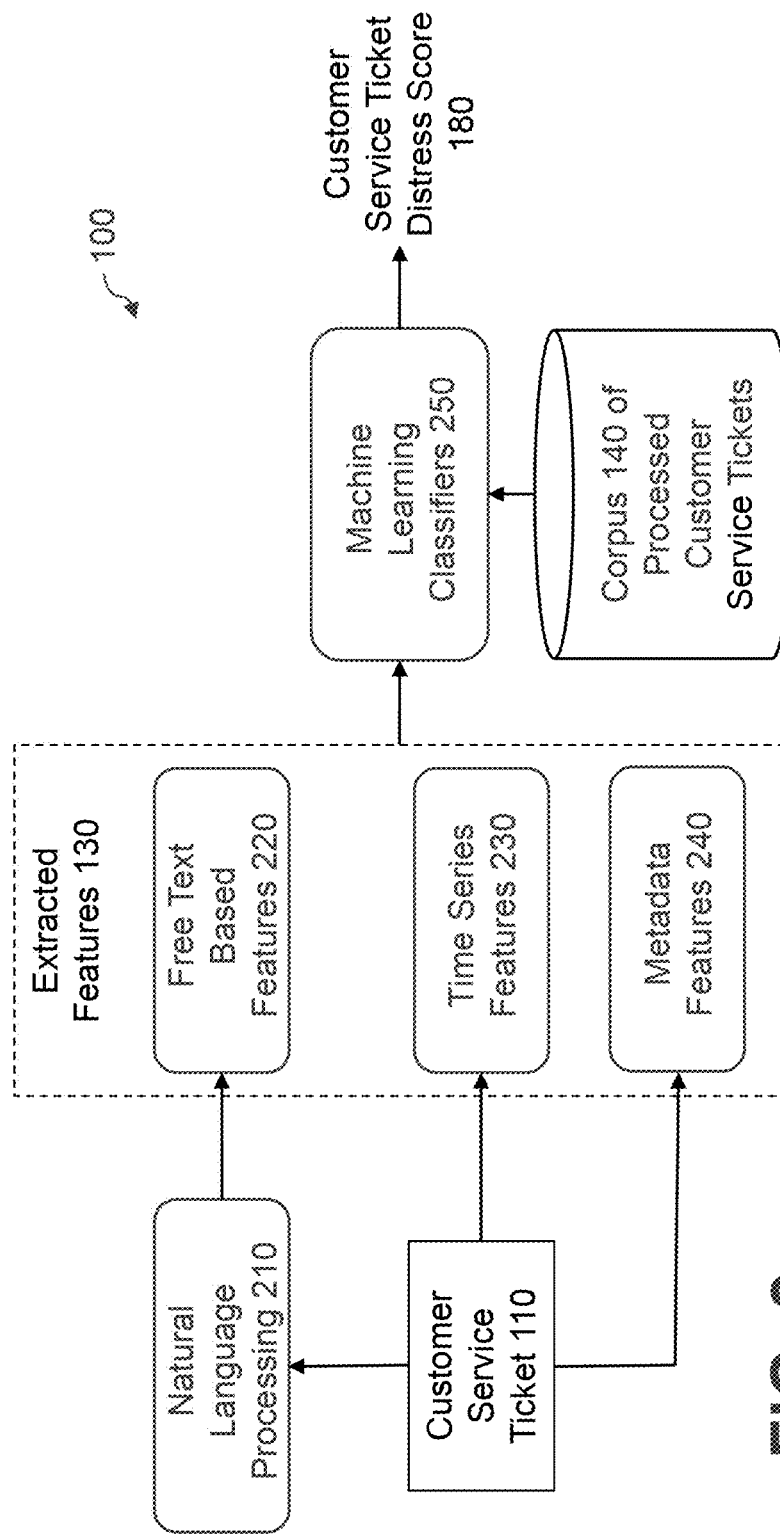
FIG. 2 illustrates the exemplary customer service ticket prioritization system of FIG. 1 in further detail, according to at least one embodiment.

FIG. 2 illustrates the exemplary customer service ticket prioritization system 100 of FIG. 1 in further detail, according to at least one embodiment. As shown in FIG. 2, a given customer service ticket 110 is applied to a natural language processing module 210 that determines one or more free text features 220. The free text features 220 provide textual information describing at least a portion of the customer service ticket 110.

It has been found that free text fields are often more accurate and informative fields than features selected, for example, from a drop list field. The exemplary natural language processing (NLP) module 210 leverages different description fields to extract the free text features 220. In at least some embodiments, the goal of the free text features 220 is to capture the themes of the customer service tickets 110 and enable the machine learning models to compare between any two customer service tickets and reveal underlying dependencies and connections. For the extraction of the free text features 220, known approaches can be employed, such as tf-idf (term frequency-inverse document frequency), topic modeling and/or doc2vec for representing documents as a vector.

In addition, the extracted features 130 also comprise one or more time series features 230 and/or one or more metadata features 240, for example, extracted by the feature extraction module 120 of FIG. 1. The time series features 230 comprise dynamic information regarding activities performed to address the customer service ticket.

One or more aspects of the disclosure recognize that the nature of customer service tickets is dynamic. Thus, customer service tickets and the data associated with such customer service tickets evolves and changes over time. For each day, for example, there can be several activities that were done as part of the process of handling the customer service ticket.

In addition, the dynamic feature collection aspects recognize that customer service tickets can be rotated and/or transferred a number of times to and among different customer service teams before the customer service tickets are resolved. Each such activity is recorded in the database of the respective organization. Thus, for each point in the lifetime of a customer service ticket (e.g., a day) there can be different values for the features and, moreover, even different features.

For each point in time, the exemplary customer service ticket prioritization system 100 extracts the extracted features 130. For a customer service ticket that was opened two days ago, for example, the exemplary customer service ticket prioritization system 100 can apply NLP techniques and time series analysis to extract more advanced and informative features. Such features can be, for example, activity issuing frequency, themes of activities, and highest customer service level that handled the ticket.

The metadata features 240 comprise, for example, product information, customer information and/or install base information.

In this manner, in one or more embodiments, the extracted features 130 introduce a large number of additional parameters to be processed by the machine learning models, such as the frequency of activities, activities agent free text descriptions, as well as static features, such as product group and historical data on customer and asset.

The extracted features 130 are applied to the machine learning classifiers 250, as discussed further below in conjunction with FIG. 3, that are trained using a corpus 140 of processed customer service tickets. In some embodiments, the corpus 140 of processed customer service tickets are labeled with an indication of whether each processed customer service ticket in the corpus 140 was a distressed customer service ticket, as noted above.

One or more of the machine learning classifiers 250 generate the customer service ticket distress score 180 indicating the likelihood that a given customer service ticket 110 will become a distressed customer service ticket, for example, based on one or more predefined distress criteria.

Figure 3:
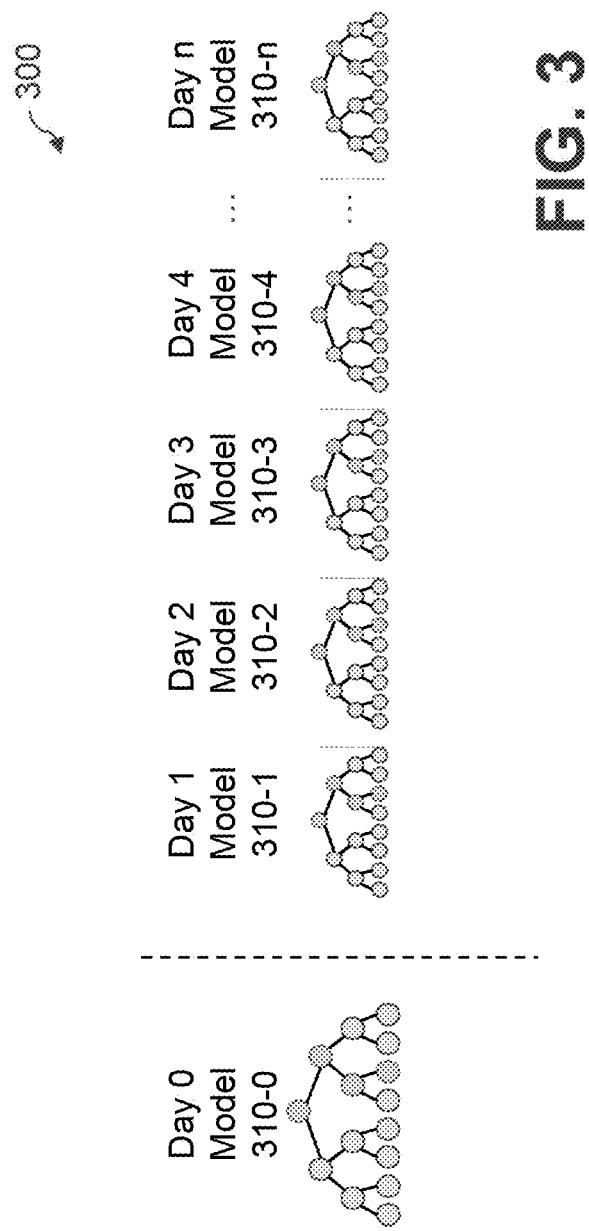
FIG. 3 illustrates the exemplary machine learning models of FIG. 1 in further detail, according to some embodiments of the disclosure.

FIG. 3 illustrates a collection of machine learning models 300, according to some embodiments of the disclosure. The exemplary machine learning models 150 of FIG. 1 can be implemented using the collection of machine learning models 300. As shown in FIG. 3, the collection of machine learning models 300 comprises of a plurality of machine learning models 310-0 through 310-$n$, each corresponding to a different time period, such as day 0 through day n, respectively.

In some embodiments, the different time periods correspond to one of hourly, daily, weekly and monthly time periods. In addition, the plurality of machine learning models 310 corresponding to the different time periods are trained using corresponding historical training data from the corpus 140, associated with the one of the hourly, daily, weekly and monthly time periods. For example, if the plurality of machine learning models 310 correspond to daily time periods, there is a different machine learning model 310 for each day that customer service ticket is pending. Thus, if a customer service ticket 110 is still pending on the second day since it was initiated, the extracted features 130 from the customer service ticket will be applied to the day 2 model 310-2, which has been trained on historical customer service tickets that were pending one the second day after initiation. Thus, each successive machine learning model 310 is trained on a different (larger) dataset from the corpus 140, as the training information is extended with additional cumulative data since the initiation of each customer service ticket.

The Day 0 model 310-0 comprises a base machine learning model used for a time period immediately following the initiation of a given customer service ticket 110. The base machine learning model 310-0 processes one or more features comprising a product group, a customer service ticket severity, an asset age, one or more customer-related historical features and/or one or more product-related historical features.

The extracted features 130 from the customer service tickets 110 are thus applied to machine learning model 310-$i$ based on an age of the respective customer service ticket.

In one or more embodiments, each of the machine learning models 310 are comprised of random forest models for different points in time (e.g., using a given machine learning model 310 based on age of the respective customer service ticket) to improve the predictive capability of the machine learning model 310 and to capture the censored (e.g., often less than complete) nature of the service request data.

As noted above, one or more of the plurality of machine learning models 310 provide a customer service ticket distress score 180 indicating a likelihood that the customer service ticket will become a distressed customer service ticket.

The "time period" associated with each individual machine learning model 310 thus refers to the "age" of the customer service ticket (e.g., several machine learning models are generated for different ages of a customer service ticket). For example, the machine learning models 310 can comprise a base model 310-0 for tickets that were just issued (the model 310-0 may only have features that are not time dependent and are fixed, such as product group, severity and asset age; and historical features on the customer and/or the asset, such as total service request assigned to the customer/asset), and then another model 310-1 for tickets that were issued a day before (the model 310-1 will have the same features as in the previous based model 310-0, along with features that are generated from the activities which are involved over time since the initiation), and then another model 310-2 for tickets that were issued two days before and so on.

Generally, when the time period corresponds to a daily time period, for example, the exemplary customer service ticket prioritization system 100 can evaluate, on a daily basis, the likelihood of a customer service ticket being a distressed customer service ticket, where each evaluation takes into account new information on the ticket handling process. The goal in some embodiments is to detect distressed tickets as early as possible.

Figure 4:
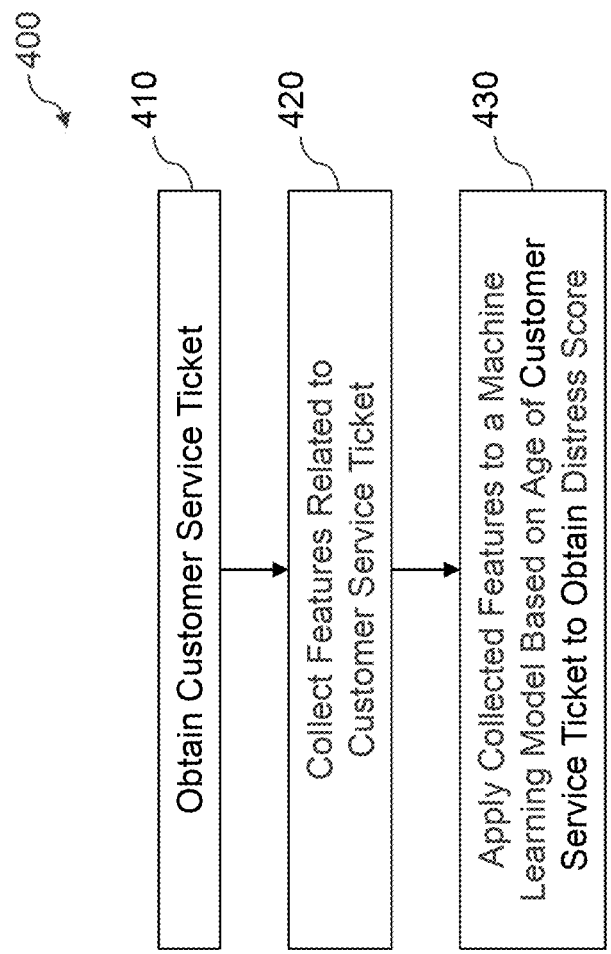
FIG. 4 is a flow chart illustrating a customer service ticket prioritization process performed by the exemplary customer service ticket prioritization system of FIG. 1, according to one or more embodiments.

FIG. 4 is a flow chart illustrating a customer service ticket prioritization process 400 performed by the exemplary customer service ticket prioritization system 100, according to one or more embodiments. As shown in FIG. 4, the exemplary customer service ticket prioritization process 400 initially obtains a customer service ticket during step 410.

During step 420, the exemplary customer service ticket prioritization process 400 collects in response to the obtaining of the customer service ticket, a plurality of features related to the customer service ticket, such as features comprising dynamic information regarding activities performed to address the customer service ticket and textual information describing at least a portion of the customer service ticket.

Finally, during step 430, the customer service ticket prioritization process 400 applies the collected features to at least one of a plurality of machine learning models 310 each corresponding to a different time period to obtain a distress score indicating a likelihood that the customer service ticket will become a distressed customer service ticket, as discussed above. The plurality of machine learning models 310 are trained on historical data based on the corresponding different time period. In addition, the collected features are applied to the at least one machine learning model based on an age of the customer service ticket.

In some embodiments, the disclosed customer service ticket prioritization techniques evaluate a number of features of each customer service ticket and apply the considered features to a machine learning model that has been selected based on an age of the customer service ticket and assigns a distress score indicating a likelihood that the customer service ticket will become a distressed customer service ticket. Among other benefits, the assigned distress score can be used, for example, to direct the associated customer service ticket to the customer service personnel that are best able to resolve the problem, and or to reassign distressed customer service tickets so that they can be resolved.

In addition, the disclosed techniques for customer service ticket prioritization using multiple time-based machine learning models provide significant cost savings on operations for customer service ticket processing and also improve the total customer experience and loyalty by providing a better quality of service and a higher level of satisfaction and professionalism.

One or more embodiments of the disclosure provide improved methods, apparatus and computer program products for customer service ticket prioritization using multiple time-based machine learning models. The foregoing applications and associated embodiments should be considered as illustrative only, and numerous other embodiments can be configured using the techniques disclosed herein, in a wide variety of different applications.

It should also be understood that the disclosed customer service ticket prioritization techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for customer service ticket prioritization using multiple time-based machine learning models may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based customer service ticket prioritization engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based customer service ticket prioritization platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
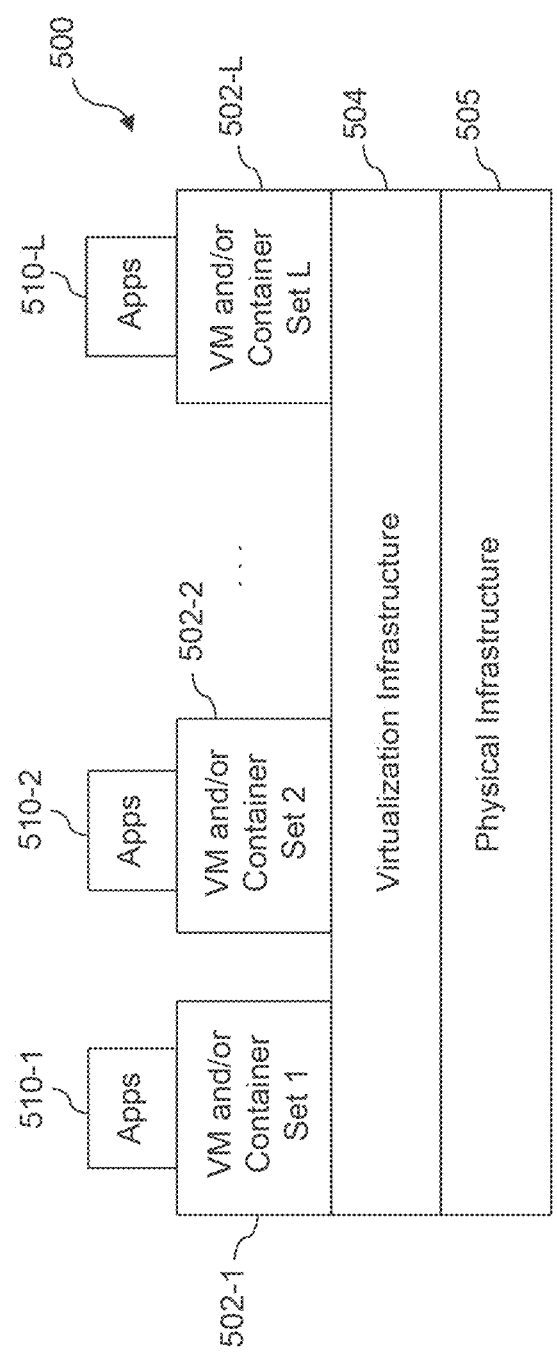
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the customer service ticket prioritization system 100 of FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide customer service ticket prioritization functionality of the type described above for one or more processes running on a given one of the VMs. For example, each of the VMs can implement customer service ticket prioritization control logic and associated feature extraction and machine learning model training and selection for providing customer service ticket prioritization functionality for one or more processes running on that particular VM.

A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide customer service ticket prioritization functionality of the type described above for one or more processes running on different ones of the containers. For example, a container host device supporting multiple containers of one or more container sets can implement one or more instances of customer service ticket prioritization control logic and associated feature extraction and machine learning model training and selection for providing customer service ticket prioritization functionality.

As is apparent from the above, one or more of the processing modules or other components of customer service ticket prioritization system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
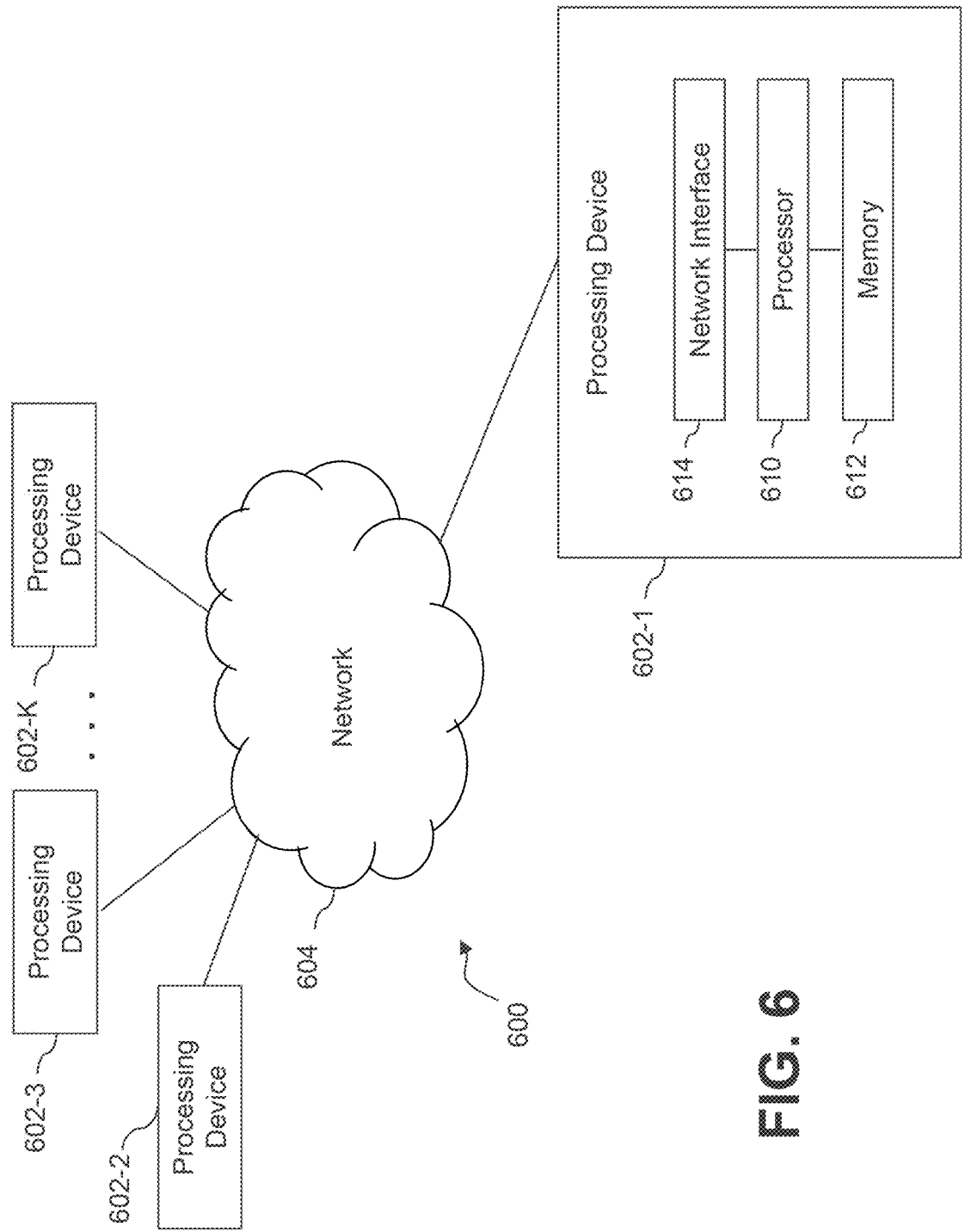
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a given customer service ticket;
   collecting, in response to the obtaining, a plurality of features related to the given customer service ticket, wherein the plurality of features comprises dynamic information regarding activities performed to address the given customer service ticket and textual information describing at least a portion of the given customer service ticket;
   obtaining a plurality of machine learning models, wherein each of the plurality of machine learning models processes customer service tickets of a different ticket age, wherein each respective machine learning model is trained on a corresponding set of training data comprising features of historical customer support tickets having a ticket age that corresponds to the ticket age processed by the respective machine learning model, wherein the training data for at least a first one of the machine learning models comprises at least a portion of the training data for at least a second one of the machine learning models, and wherein the second machine learning model processes customer service tickets having a younger ticket age than the customer service tickets processed by the first machine learning model;
   selecting a given one of the plurality of machine learning models based at least in part on a ticket age of the given customer support ticket relative to the respective ticket ages of the customer service tickets processed by the plurality of machine learning models;
   applying the collected plurality of features related to the given customer service ticket to the selected machine learning model to obtain a distress score indicating a likelihood that the given customer service ticket will become a distressed customer service ticket; and
   processing at least the given customer support ticket based at least in part on the distress score;
   wherein the method is performed by at least one processing device comprising a processor coupled to a memory.

2. The method of claim 1, wherein the plurality of features related to the given customer service ticket further comprise one or more of a frequency of activities performed to address the given customer service ticket, product information, customer information and install base information.

3. The method of claim 1, wherein the textual information describing the given customer service ticket captures a theme of the given customer service ticket.

4. The method of claim 1, wherein the textual information describing the given customer service ticket is extracted from the given customer service ticket based on one or more of a term frequency, a topic model and a vector representation.

5. The method of claim 1, wherein the plurality of machine learning models processing customer service tickets of a different ticket age each correspond to at least one of: (i) a different number of hours since the initiation of the given customer support ticket, (ii) a different number of days since the initiation of the given customer support ticket, (iii) a different number of weeks since the initiation of the given customer support ticket, and (iv) a different number of months since the initiation of the given customer support ticket.

6. The method of claim 5, wherein each of the plurality of machine learning models processing customer service tickets of the different ticket age is trained using corresponding training data associated with the at least one of: (i) the different number of hours since the initiation of the given customer support ticket, (ii) the different number of days since the initiation of the given customer support ticket, (iii) the different number of weeks since the initiation of the given customer support ticket, and (iv) the different number of months since the initiation of the given customer support ticket.

7. The method of claim 6, wherein the corresponding training data associated with a given machine learning model comprises cumulative training data based at least in part on the historical customer support tickets having a ticket age up to the ticket age associated with given machine learning model.

8. The method of claim 1, wherein each of the plurality of machine learning models is based on random forest models.

9. The method of claim 1, wherein the plurality of machine learning models comprises a base machine learning model used for a time period immediately following the obtaining, wherein the base machine learning model processes one or more features comprising a product group, a support ticket severity, an asset age, one or more customer-related historical features and one or more product-related historical features.

10. A computer program product, comprising a tangible machine-readable storage medium having encoded therein executable code of one or more software programs, wherein the one or more software programs when executed by at least one processing device perform the following steps:
   obtaining a given customer service ticket;
   collecting, in response to the obtaining, a plurality of features related to the given customer service ticket, wherein the plurality of features comprises dynamic information regarding activities performed to address the given customer service ticket and textual information describing at least a portion of the given customer service ticket;
   obtaining a plurality of machine learning models, wherein each of the plurality of machine learning models processes customer service tickets of a different ticket age, wherein each respective machine learning model is trained on a corresponding set of training data comprising features of historical customer support tickets having a ticket age that corresponds to the ticket age processed by the respective machine learning model, wherein the training data for at least a first one of the machine learning models comprises at least a portion of the training data for at least a second one of the machine learning models, and wherein the second machine learning model processes customer service tickets having a younger ticket age than the customer service tickets processed by the first machine learning model;
   selecting a given one of the plurality of machine learning models based at least in part on a ticket age of the given customer support ticket relative to the respective ticket ages of the customer service tickets processed by the plurality of machine learning models;
   applying the collected plurality of features related to the given customer service ticket to the selected machine learning model to obtain a distress score indicating a likelihood that the given customer service ticket will become a distressed customer service ticket; and
   processing at least the given customer support ticket based at least in part on the distress score.

11. The computer program product of claim 10, wherein the textual information describing the customer service ticket captures a theme of the given customer service ticket.

12. The computer program product of claim 10, wherein the plurality of machine learning models processing customer service tickets of a different ticket age each correspond to at least one of: (i) a different number of hours since the initiation of the given customer support ticket, (ii) a different number of days since the initiation of the given customer support ticket, (iii) a different number of weeks since the initiation of the given customer support ticket, and (iv) a different number of months since the initiation of the given customer support ticket, and wherein each of the plurality of machine learning models processing customer service tickets of the different ticket age is trained using corresponding training data associated with the at least one of: (i) the different number of hours since the initiation of the given customer support ticket, (ii) the different number of days since the initiation of the given customer support ticket, (iii) the different number of weeks since the initiation of the given customer support ticket, and (iv) the different number of months since the initiation of the given customer support ticket.

13. The computer program product of claim 12, wherein the corresponding training data associated with a given machine learning model comprises cumulative training data based at least in part on the historical customer support tickets having a ticket age up to the ticket age associated with given machine learning model.

14. The computer program product of claim 10, wherein the plurality of machine learning models comprises a base machine learning model used for a time period immediately following the obtaining, wherein the base machine learning model processes one or more features comprising a product group, a support ticket severity, an asset age, one or more customer-related historical features and one or more product-related historical features.

15. An apparatus, comprising:
   a memory; and
   at least one processing device, coupled to the memory, operative to implement the following steps:
   obtaining a given customer service ticket;
   collecting, in response to the obtaining, a plurality of features related to the given customer service ticket, wherein the plurality of features comprises dynamic information regarding activities performed to address the given customer service ticket and textual information describing at least a portion of the given customer service ticket;
   obtaining a plurality of machine learning models, wherein each of the plurality of machine learning models processes customer service tickets of a different ticket age, wherein each respective machine learning model is trained on a corresponding set of training data comprising features of historical customer support tickets having a ticket age that corresponds to the ticket age processed by the respective machine learning model, wherein the training data for at least a first one of the machine learning models comprises at least a portion of the training data for at least a second one of the machine learning models, and wherein the second machine learning model processes customer service tickets having a younger ticket age than the customer service tickets processed by the first machine learning model;
   selecting a given one of the plurality of machine learning models based at least in part on a ticket age of the given customer support ticket relative to the respective ticket ages of the customer service tickets processed by the plurality of machine learning models;

applying the collected plurality of features related to the given customer service ticket to the selected machine learning model to obtain a distress score indicating a likelihood that the given customer service ticket will become a distressed customer service ticket; and processing at least the given customer support ticket based at least in part on the distress score.

16. The apparatus of claim 15, wherein the plurality of machine learning models processing customer service tickets of a different ticket age each correspond to at least one of: (i) a different number of hours since the initiation of the given customer support ticket, (ii) a different number of days since the initiation of the given customer support ticket, (iii) a different number of weeks since the initiation of the given customer support ticket, and (iv) a different number of months since the initiation of the given customer support ticket.

17. The apparatus of claim 16, wherein each of the plurality of machine learning models processing customer service tickets of the different ticket age is trained using corresponding training data associated with the at least one of: (i) the different number of hours since the initiation of the given customer support ticket, (ii) the different number of days since the initiation of the given customer support ticket, (iii) the different number of weeks since the initiation of the given customer support ticket, and (iv) the different number of months since the initiation of the given customer support ticket.

18. The apparatus of claim 17, wherein the corresponding training data associated with a given machine learning model comprises cumulative training data based at least in part on the historical customer support tickets having a ticket age up to the ticket age associated with given machine learning model.

19. The apparatus of claim 10, wherein the plurality of machine learning models comprises a base machine learning model used for a time period immediately following the obtaining, wherein the base machine learning model processes one or more features comprising a product group, a support ticket severity, an asset age, one or more customer-related historical features and one or more product-related historical features.

20. The apparatus of claim 15, wherein the textual information describing the customer service ticket captures a theme of the given customer service ticket.

\* \* \* \* \*

UNITED STATES PATENT AND TRADEMARK OFFICE
CERTIFICATE OF CORRECTION

| | |
|---|---|
| PATENT NO. | : 11,587,094 B2 |
| APPLICATION NO. | : 16/587364 |
| DATED | : February 21, 2023 |
| INVENTOR(S) | : Anat Parush Tzur et al. |

It is certified that error appears in the above-identified patent and that said Letters Patent is hereby corrected as shown below:

In the Claims

Column 14, Line 13, in Claim 19, replace "The apparatus of claim 10, wherein" with -- The apparatus of claim 15, wherein --

Signed and Sealed this
Twenty-first Day of March, 2023

*Katherine Kelly Vidal*

Katherine Kelly Vidal
*Director of the United States Patent and Trademark Office*